United States Patent [19]

Simms et al.

[11] Patent Number: 4,509,075
[45] Date of Patent: Apr. 2, 1985

[54] AUTOMATIC OPTICAL INSPECTION APPARATUS

[75] Inventors: R. John Simms, Menlo Park; Jerry D. Haney, Sunnyvale, both of Calif.

[73] Assignee: Oxbridge, Inc., Mountain View, Calif.

[21] Appl. No.: 273,508

[22] Filed: Jun. 15, 1981

[51] Int. Cl.³ .............................................. H04N 7/18
[52] U.S. Cl. ................................ 358/106; 250/223 B
[58] Field of Search ................. 358/93, 106; 356/390, 356/394; 250/223 B; 209/528, 526, 524; 283/21; 40/310

[56] References Cited

U.S. PATENT DOCUMENTS

| | | | |
|---|---|---|---|
| 3,650,397 | 3/1972 | Bornemeir | 209/80 |
| 3,662,181 | 5/1972 | Hercher et al. | 250/223 B |
| 3,840,857 | 10/1974 | Knight et al. | 340/146.3 F |
| 3,891,324 | 6/1975 | Davies | 356/156 |
| 4,006,296 | 2/1977 | Peterson | 358/106 |
| 4,037,971 | 7/1977 | Belleson et al. | 356/199 |
| 4,065,212 | 12/1977 | Belleson et al. | 356/167 |
| 4,079,416 | 3/1978 | Faani et al. | 358/106 |
| 4,111,557 | 9/1978 | Rottenkolber et al. | 356/168 |
| 4,115,939 | 9/1978 | Marks | 40/310 |
| 4,136,957 | 1/1979 | Uno et al. | 356/394 |
| 4,229,797 | 10/1980 | Ledley | 358/106 |
| 4,245,243 | 1/1981 | Gutjahr et al. | 358/106 |
| 4,380,025 | 4/1983 | Deane | 358/106 |

*Primary Examiner*—Joseph A. Orsino, Jr.
*Attorney, Agent, or Firm*—Limbach, Limbach & Sutton

[57] ABSTRACT

An automatic optical inspection method apparatus wherein optical preprogramming means are utilized to designate the locations of reference features on a reference object, and to instruct the system regarding the reference feature characteristics, and of reference feature parameters, the automatic optical inspection apparatus is then utilizing information obtained from the optical pre-programming means to analyze image data obtained from objects under inspection, the apparatus initially obtaining a larger amount of optical imaging data and systematically thereafter reducing the quantity of such data by appropriate signal processing and gating, so that an accept or reject decision is based upon a small portion of the originally obtained data.

35 Claims, 10 Drawing Figures

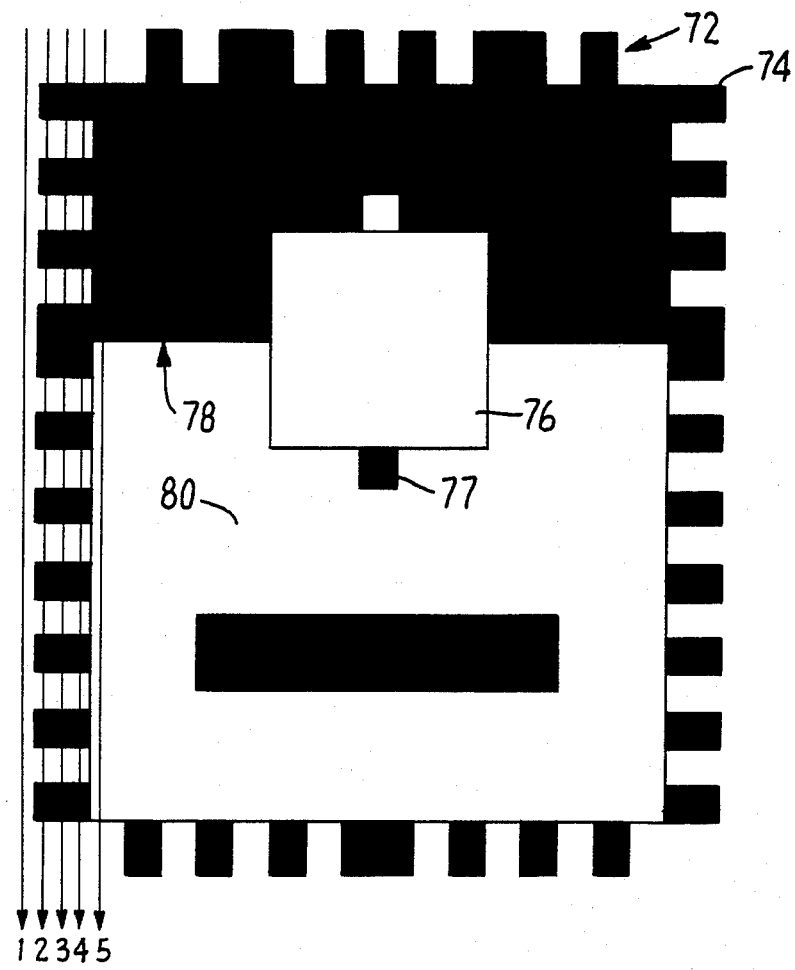
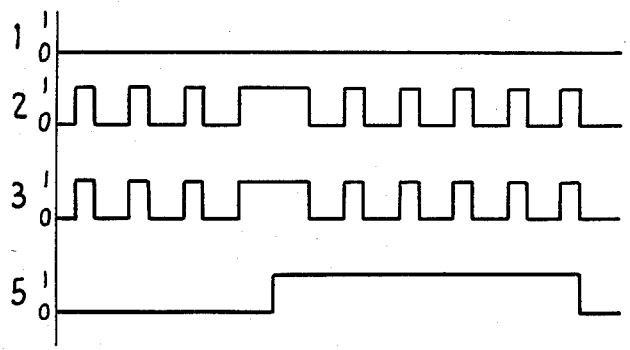
FIG.5.

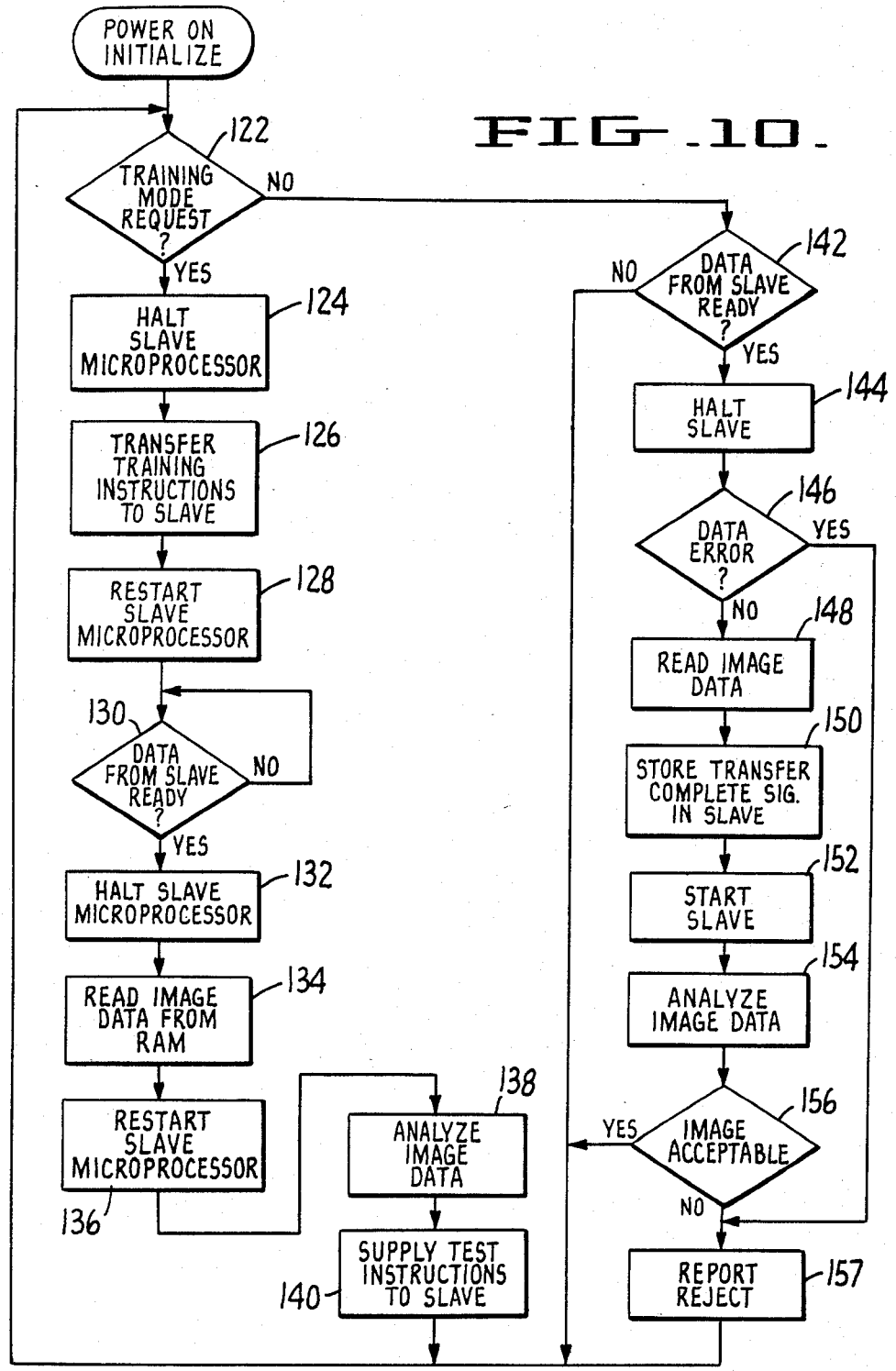

AUTOMATIC OPTICAL INSPECTION APPARATUS

BACKGROUND OF THE INVENTION

The present invention relates, generally, to inspection apparatus, and, in particular, to automatic optical inspection apparatus for on-line inspection of articles, having self-programming capability.

Quality assurance by on-line inspection has until recently been the province of human inspectors stationed at key points along a production line for the purpose of detecting and removing defective specimens of the product. Although the skill levels usually required are not high, the task requires attention and diligence of a high order. From a cost standpoint, quality inspection requires large man-hour expenditures to accomplish tasks which are highly routine.

Many industrial products are inspected visually during the manufacturing process to determine if a certain operation has been performed properly. Characteristics being inspected include: shape, size, presence/absence of holes and other details; color, surface finish, gloss, code marks and other character recognition features; completeness, presence of a sub-part; orientation, label placement, proper label, proper product, flaws, defects, drips, spillage and particles.

Some specific examples of the above include the color of tomato ketchup, contaminants in I.V. saline solutions, label placement on liquid detergents, orientation of semiconductor die and lead frames, completion of mesh etching, proper pharmaceutical package for the product contained therein, loose debris and defects in beverage bottles and uniform coating of magnetic tape. These are all examples where the inspection task is now being performed by one or more persons on each production line and where automation would be welcomed.

Attempts to reduce the amount of human labor involved have followed several paths or combinations of them. Most simple, perhaps, is to reduce the quality level standard required to be met or to reduce the number of units actually inspected; i.e., statistical sampling. Either of these approaches affects an immediate reduction in labor costs, but with a corresponding loss in level of confidence that the end product will meet the desired quality standards. Of the two, "sampling" techniques, whereby a statistically significant percentage of each production run is selected for analysis on a random basis, offer the possibility of maintaining high overall quality levels, but at the risk of an occasional inferior product being passed into the stream of commerce.

For many low-risk product applications, this risk is acceptable since the few inferior products which do get past inspection cause slight, if any, damage even to the maker's reputation. For other applications, however, such as dangerous drugs or flammable liquids, the absence of an appropriate warning label may lead to disastrous consequences. In such cases, inspection of less than 100 percent of the product is foolhardy.

Efforts to provide inspection of entire production runs without incurring the high labor cost attendent to human inspection, and without the errors which occur when fatigue sets in, attention flags, and diligence wanes, have led to the design of a variety of mechanical substitutes for the human inspector. Typical of such machines are those which detect weight, fill-level or presence of the product.

Unfortunately, when more data needs to be analyzed in order to conduct a proper inspection, the cost of equipment can increase astronomically. Moreover, since such data analysis requires a high level of sophistication in order to even approximate the rapid and perhaps subconscious routines which a human inspector's brain and sense follow, the labor involved in applying equivalent mechanical means to the specific task at hand frequently exceeds the cost of the former labor-intensive inspection method. As such, only those applications having the highest volumes can justify the equipment and preparatory operating cost.

Substitution of machine labor for human labor involves initially analyzing the tasks which are involved in making quality inspection decisions. The human inspection task can be defined in a very general way as including illumination of an object, visual perception of the object followed by retinal pre-processing, forebrain data handling, memory for storage of relevant inspection standards, comparision of the detected object with the stored inspection standards, decision making based upon the results of the comparison with stored standards, and determination and execution of an appropriate action in response to the decision.

Electronic analogs of each of these sub-tasks exist and have been employed in simplified forms for a large number of inspection tasks employing dedicated apparatuses, wherein all, or some, of the elements are combined in to an equipment intended for a specific application.

The electronic analogs include: illumination, as before, with objective and imaging optics; sensors which replace the eye of the human operator; analog or digital signal processing or both corresponding to forebrain data handling in a human operator, digital memory means corresponding to the human operator's memory; digital comparators and correlation circuitry corresponding to comparison of the observed features with the inspection standards; and output actuators corresponding to the action taken by the human operator when a defect is discovered.

Adaptive pattern recognition equipment can be employed to good advantage in many applications, but the cost and complexity of the equipment is high in comparison with the results desired. Moreover, for example, when allowance for tolerances on product dimensions are sought to be incorporated in the inspection equipment, the programming becomes extremeley complex.

With the advent of the general purpose, digital, programmable microprocessor, the logic, evaluation and comparison tasks performed by a human inspector could be duplicated within the memory and arithmetic logic unit of the microprocessor. However, for even the simplest measurements, a high level of skill is required to design the required application program by which a microprocessor-based inspection apparatus can be implemented. The result is that the cost of programming can easily exceed the benefit gained by automation.

The high-skill/high-cost labor required to program the microprocessor results in a high overall application cost, even though equipment costs may be reduced by the economies of scale which result when a general purpose machine can be substituted for dedicated machines tailored to each application.

For a conventional pattern recognition system, an entire field of data is obtained which covers and overlaps the edges of the object under inspection, and, comparisons are performed over the entire data field. For the most part, however, only certain features of the object actually need to be considered in order to determine whether any given object characteristic falls within the standard for acceptability. Thus, a label inspection station could be satisfactorily realized by sampling only the four corners of a square label, for example, thereby determining the acceptability of its position and angular displacement of the label. By extracting only the salient points from the field of available data, and making a decision solely upon these salient points, the cost of equipment, and the data throughput rate can both be optimized.

Finally, a severe drawback of conventional pattern recognition equipment lies in the fact that the operator is forced to operate "blind" with respect to the programming details associated with a particular, machine performance. For example, the inspection station operator has little control over or knowledge of the information concerning location tolerance limits which have been programmed in the machine and, accordingly, has little confidence in its performance. To remedy this, the operator could be a skilled programmer who understands and appreciates the form and content of the data which have been input into the equipment. However, this results in the overall inspection station hourly operating cost being raised back toward the cost of inspection by the original, human inspector.

SUMMARY OF THE INVENTION

The foregoing and other problems of prior art inspection apparatus are overcome by the present invention of an automatic optical inspection method and apparatus for inspecting an illuminated, sequentially-presented, series of visually similar objects, in which the objects are compared against a reference object and a decision is made to accept or reject the current object being inspected.

Means are provided which optically specify selected portions of the reference or properly configured object. The optically specified portions of the reference object are then analyzed to derive reference parameters or inspection instructions for use in examining the objects to be inspected. In accordance with the reference parameters, portions of the optical image signal of an object under inspection are compared against reference data specified within the reference parameters. These image signal portions correspond to the previously specified portions of the reference object from which the reference parameters were derived. In other words, the image signal portions originate from portions of the object under inspection which portions are the counterparts of the specified portions of the reference object. The results of the above comparison are evaluated, also in accordance with the reference parameters, and an accept-or-reject decision is made.

In the preferred embodiment of the present invention, the apparatus comprises optical specifying means, imaging and video signal-generating means, reference data storage means, signal processing and gating means, comparative evaluation means and intelligent processing and control means. The apparatus has a "training" mode in which reference parameters are obtained, and an "inspection" mode in which objects are inspected and accepted or rejected.

The optical specifying means provides an optical designation of a number of reference features or portions on the reference object, along with a number of reference feature specifications, including a nomimal location for each reference feature, a characterization of the optical nature of each feature, and tolerance information. The characterization of the optical nature of each feature can be an indication of the type of transition which is to be expected; for example, a light to dark transition, or a dark to light transition, and the direction of the transition.

The imaging and video signal-generating means obtain a video image of the object under inspection, and convert the image into an equivalent electrical image signal.

The signal processing and gating means receive the electrical image signals from the imaging and video signal-generating means, process these image signals, and select portions of the image signal for further processing. These selected image signals are supplied to the comparative evaluation means wherein the signals are compared against reference data obtained from the reference data storage means.

The intelligent processing and control means interact with the imaging and video signal-generating means, the signal processing and gating means, the comparative evaluation means, and the reference data storage means. The intelligent processing and control means receive and analyze the electrical image signals corresponding to the reference features and references feature specifications and, based upon the analysis, select a specific inspection control and processing sequence and designate a corresponding reference data set. Also derived are decision criteria, by which the objects to be inspected will be tested.

The intelligent processing and control means then provide timing signals to the imaging and video signal-generating means to acquire image signals of the objects under inspection. Signal processing and gating commands are supplied to the signal processing and gating means, as well as read and write commands and reference data to the reference data storage means to control the evaluation of the inspected object. The intelligent processing and control means receive the results of the comparison operation in the comparative evaluation means, and, based upon these results, make a decision whether to the accept or reject of the current object being tested. The intelligent processing and control means therefore play dual roles: first, to control reference parameter gathering, in a "training" mode, and, second, to control data gathering and evaluation in an inspection mode.

The operation of the present invention involves a two-step process. In the first step, the operator selects an object as the standard or reference object against which all other objects are to be compared The operator then utilizes the optical specifying means to designate the particular features on the reference object which are to be examined and upon which an accept or reject decision is to be made. In one embodiment of the present invention, the optical specifying means include adhesive backed targets, each target having a window through which optical scanning can be performed. A target is placed over each reference feature and oriented so that the particular reference feature is visible through the window. The operator then causes the apparatus to scan the object so that information from the target and the reference feature within the target window, is transferred to the intelligent processing and control means for analysis. This is the "training" mode wherein information is transferred to the system which, in turn, prepares the system for the actual inspection of the objects of interest.

In the second step of the process, the objects to be inspected are sequentially presented to the imaging and video signal-generating means. The imaging and video signal-generating means obtain a complete video image signal of the object, and transfer the signal to the signal processing and gating means. The signal processing and gating means, under the control of the intelligent processing and control means, process the video signal, and select certain portions of the video signal for further processing. These selected signals are then converted into digitized form, and transferred to the comparative evaluation means where the signals are compared against the reference data obtained in the "training" step. The timing signals supplied to the imaging and video signal-generating means, and the processing and gating signals supplied to the processing and gating means, are derived from the information obtained in the "training" step.

Once a comparison has been made between the reference data and the selected portions of the image signal of the object being inspected, the intelligent processing and control means receive these comparison results and evaluate the results, in light of the tolerance and other criteria, to obtain an accept or reject decision. This decision is then supplied to the user as an alarm, an actuating signal, or other desired form.

It can therefore be seen that the practical operation of the present invention involves minimal programming skills. The operator, using the target embodiment of the optical preprogramming means, is immediately informed of the decision criteria which are being used by the apparatus. The placement of the targets on the reference object is very similar to the type of operation which the usual human quality control inspector performs mentally; that is, selecting certain features of the objects under inspection for actual scrutiny. Tolerance information is contained within the target and is visible and understandable to the operator. High technical skill, therefore, is not required for the satisfactory operation of the present invention.

Additionally, use of the optical specifying means permits a drastic reduction in the amount of data required to be processe in order that a decision can be made. In the present invention, a substantial amount of redundant and inconsequential data is eliminated, while data of a salient nature are retained. As a consequence, hardware, system analysis, and set-up costs can be greatly reduced, with the overall effectiveness of the optical inspection apparatus being maintained. The present invention also offers great flexibility in the designation of the particular reference features to be used. For example, a single target could be used in a situation where the presence or absence of a particular feature is all that is required for a decision; on the other hand, where a number of complex features are involved, a number of targets could be used so that the apparatus considers all of the critical features in making a decision.

Further, once the training step of the process has been performed, the training information can be retained by the system for later use.

It is, therefore, an object of the present invention to provide an automatic optical inspection method and apparatus wherein optical specifying means are employed to designate a number of reference features on a reference object, and a number of reference feature specifications for each reference feature, by which inspection of the objects is to be controlled and upon which an accept/reject decision is to be made.

It is a further object of the present invention to provide an automatic optical inspection method and apparatus which closely simulates the human inspector thought process and activity in quality control inspection activity.

It is a still further object of the present invention to provide an automatic optical inspection method and apparatus wherein selected portions of the optical data obtained are utilized in the accept/reject decision-making process.

It is another object of the present invention to provide an automatic optical inspection method and apparatus wherein certain features of the object under test are selected for comparison with reference features previously designated by optical specification, and further wherein an optical image of the object under test is obtained, processed, and digitized, to form an image signal, portions of the image signal then being selected, compared against a reference, and analyzed, according to the optically specified information.

It is a further object of the present invention to provide an automatic optical inspection method and apparatus wherein optical specifying means, positioned on a reference object supply information to an intelligent processing means by which the intelligent processing means select a sequence of processing and control steps, the processing and control steps being used to control circuitry in the acquisition and processing of image signals from an object under test, and further wherein optical specifying means also supply specifications by which the intelligent processing means control and analyze a comparison of the image signals from the object under test.

It is a still further object of the present invention to provide an automatic optical inspection apparatus wherein the intelligent processing means comprises a host processor and a slave processor, the host processor analyzing data supplied by the slave processor and supplying control and processing instructions to the slave processor, and the slave processor performing real time data acquisition and control tasks according to instructions supplied by the host processor, and supplying data thereby acquired to the host processor.

It is still another object of the present invention to provide a method for automatic optical inspection including the steps of designating reference features and reference feature parameters by optical specifying means, obtaining an image signal of an object under test, and processing, selecting and analyzing portions of the image signal according to the reference feature and feature specification data.

The foregoing and other objects, features and advantages of the present invention will be more readily understood upon consideration of the following detailed description of certain preferred embodiments of the invention, taken in conjunction with the accompanying drawings.

BRIEF DESCRIPTION OF THE DRAWINGS

FIG. 5 is an example of one embodiment of a target.

FIG. 10 is a flow diagram of a functional block of the intelligent processing and control means.

DETAILED DESCRIPTION OF THE PREFERRED EMBODIMENTS

Figure 1:
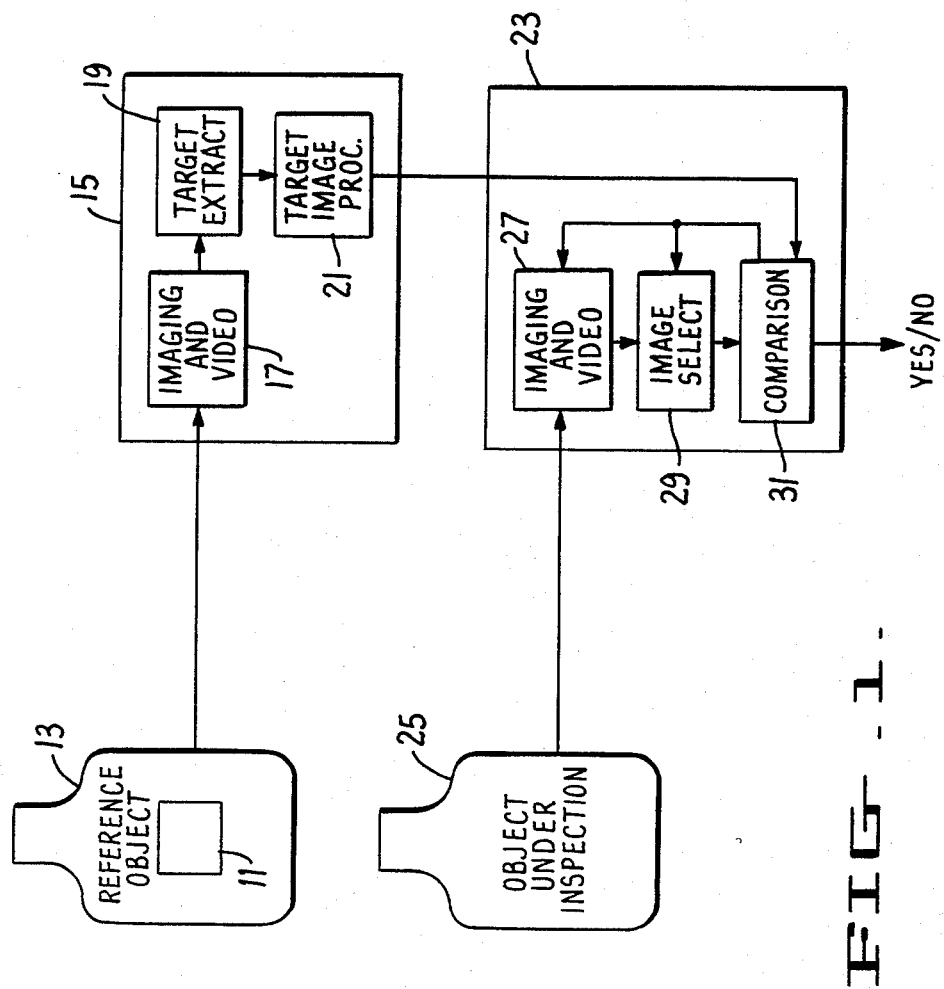
FIG. 1 is a functional block diagram of the present invention.

Generally, an object 10, or objects are placed on a moving surface, such as a conveyor belt 12. The object is illuminated by an appropriate light source 14. The rate of movement of the belt 12 is monitored by a motion detector means, such as a techometer 16. A presence detection means, such as an optical marker 18, is positioned so that the movement of the object 10 past a predetermined point along the path of the belt 12 will cause the optical marker 18 to output an object present signal. This object present signal and the motion detector means output signal are both supplied to the the present invention for use in synchronizing the operation of the present invention with the movement of the belt 12, and the object 10 thereon.

Referring to FIG. 1, a generalized, functional diagram of the present invention is shown. Means, such as a target 11, are provided for optically specifying portions of a properly configured object, or reference object, 13. Reference parameter derivation means 15 obtain data from the specified portions of the reference object and derive reference parameters from the data.

In the reference parameter derivation means 15, the reference object is optically scanned and converted into electrical image signals by imaging and video circuitry 17. The image signals are then supplied to a target recognition circuit 19 which extracts those image signals which correspond to the reference object portions as specified by the targets 11. These target image signals are then analyzed in processing circuit 21 to obtain reference parameters which include reference data and an inspection control and processing sequence. These reference parameters are then used by the data processing circuitry 23 in evaluating the particular object under inspection 25.

In the data processing circuitry 23, imaging and video circuits 27 obtain an equivalent electrical image signal of the object under inspection 25 in accordance with the inspection control and processing sequence. The image signal is supplied to image select circuitry 29 where those image signals which correspond to, i.e. are counterparts of, the previously designated portions of the object are selected from the total image sigal. The selected image signals are compared against the corresponding reference data in comparison circuitry 31. Comparison circuitry 31 also evaluates the results of the comparison, in light of the reference parameters, to derive an accept-or-reject decision.

It is to be understood that the present invention need not be physically implemented according to the functional boundaries laid out above. For example, the imaging and video circuit 17, in the reference parameter derivation circuitry 15, and the imaging and video circuit 27, in the data processing circuitry 23, can be the same physical unit with the timing and control of the circuit differing with the application. Likewise, the target recognition circuit 19 and processing circuit 21, as well as the comparison circuitry 31, can be implemented by a common processing circuit, with a different set of processing steps and criteria being used for the reference parameter derivation mode and for the object inspection mode.

In the preferred embodiment of the present invention, the reference parameter derivation, or "training", mode and the object inspection mode are implemented using common circuitry, but with different processing steps and criteria for each mode.

Figure 2:
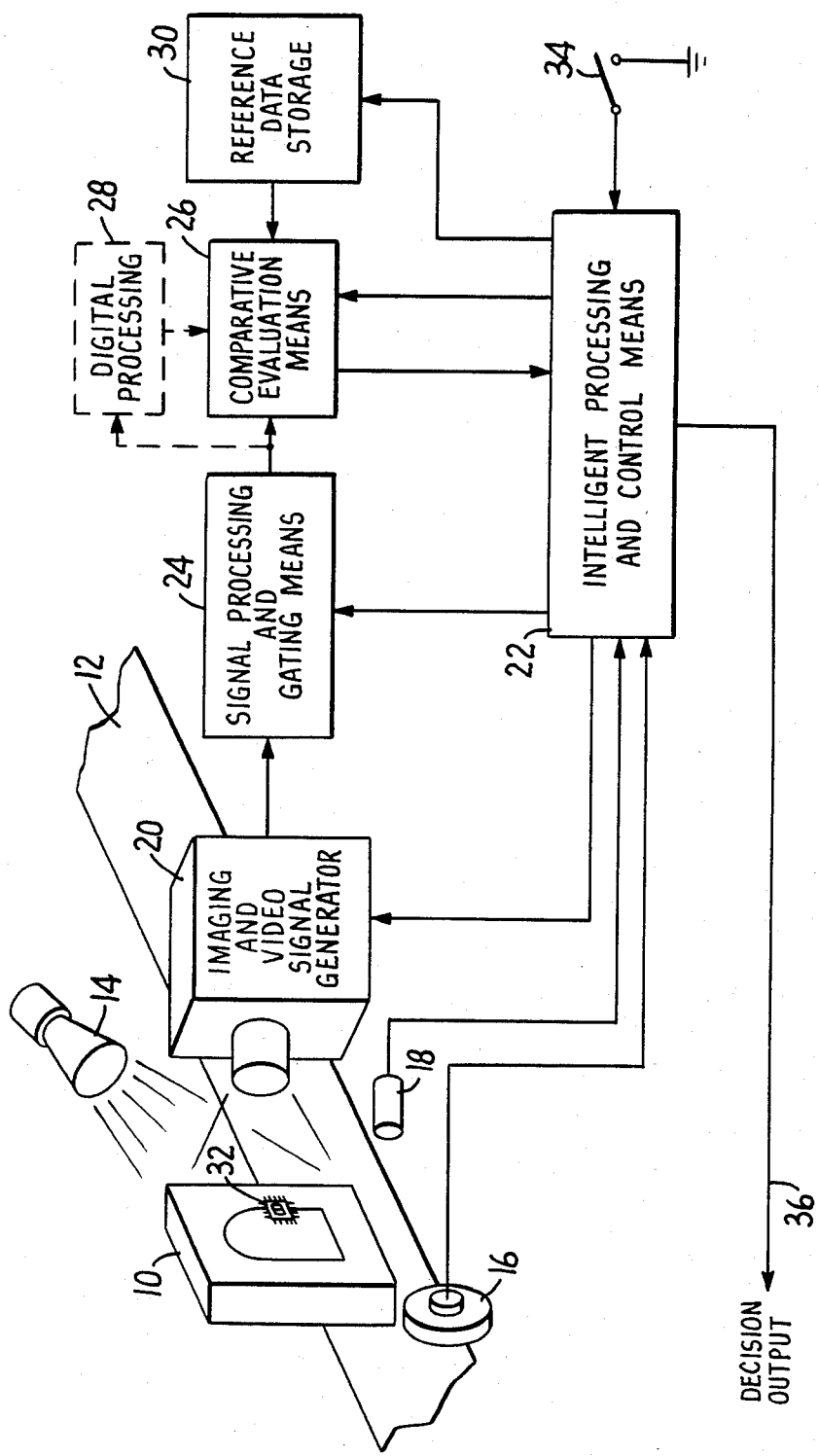
FIG. 2 is a simplified block diagram of the present invention.

Referring more particularly to FIG. 2, the preferred embodiment will now be described. An image of the illuminated object 10 is obtained by imaging and video signal generating means 20. The point in time at which acquisition of the image begins, and the rate of acquisition is controlled by signals supplied from the intelligent processing and control means 22. These control and timing signals are, in part, a function of the optical marker 18 signal, and the tachometer 16 signal. The image of the object 10 is converted into an equivalent video image signal by the imaging and video signal generator 20, and then supplied to the signal processing and gating means 24.

The signal processing and gating means provide analog processing, digital processing, as well as a signal selection function. The video image signal received from the imaging and video signal generating means 20 is normally in analog form. The analog processing includes gain control, buffering and filtering functions. These functions, are controlled by signals supplied from the intelligent processing and control means 22. The digital processing functions include analog to digital (A/D) conversion, which is also controlled by the intelligent processing and control means 22. A gating function is also implemented within the signal processing and gating means 24, under control the intelligent processing and control means, to select certain portions of the image signal and to reject other portions. In this manner, the large quantity of data originally received from the imaging and video signal generating means 20 is greatly reduced in size before being supplied to the comparative evaluation means 26.

At this point, it should be noted that if additional processing, such as digital correlation, and other arithmetic enhancement functions are desired to be performed, the output of the signal processing and gating means could be routed through a digital processing means 28, shown as a dotted block in FIG. 2, before being supplied to the comparative evaluation means 26.

Returning to the comparative evaluation means 26, the gated signals are compared against reference data received from reference data storage means 30. The timing by which the reference data are supplied, hence the timing of the comparison operation within the comparative evaluation means 26, is controlled by the intelligent processing and control means 22.

The results of the comparison operation are supplied to the intelligent processing means 22 which evaluate the data and supply a decision output to the operator.

The reference data within reference data storage means 30 and the control and timing signal supplied to the various processing blocks by the intelligent processing and control means 22 are derived from information obtained during a "training" phase of the operation of the present invention. In the "training" phase, a reference object is first selected. This reference object serves as a standard of comparison against which the objects to be inspected are compared. The reference object could be, for example, a bottle upon which a label is properly oriented, or a box having the proper printing in the proper orientation.

Optical specifying means are then associated with this reference object and designate a number of reference object portions or features. These features can be label edges, reflectance transitions, or the like. The optical specifying means also provide data, including information about the nature of the reference feature being designated, tolerance, and other data, all of which can be optically read by the system. In the preferred embodiment of the present invention, the optical specifying means take the form of targets 32, to be described in greater detail later.

The "training" mode is initiated by the user through switch 34. In this mode, the intelligent processing and control means 22 supply timing and control signals to the various signal processing and conditioning blocks so that the incoming imaging signal can be scanned for the presence of targets 32. When a target is found, the intelligent processing and control means 22 calculate the location of the target, more specifically, the nominal location of the reference feature designated by such target. Additionally, the intelligent processing and control means 22 process the reference feature specifications which are also supplied by the target 32.

The intelligent processing and control means 22 perform this step for all targets found on the reference object being scanned. In this manner, the system is prepared to examine image signals from an object under inspection, which correspond to certain specified nominal locations or portions on the object, for certain specified characteristics. The specified characteristics are held in reference data storage means 30, and the specified location determines the timing control signals supplied to the imaging and video signal generating means 20 and the signal processing and gating means 24 during actual object inspection. During actual inspections the output of the comparative evaluation means 26 is examined by the intelligent processing and control means 22, in accordance with the reference parameters obtained in the "training" step, to determine whether, for example, any differences between the inspected object and the reference object are within tolerance. The results of this decision are output to the user on decision output line 36.

It can therefore be seen that in the preferred embodiment, the apparatus can be configured for a "training" mode in which reference parameters are obtained by scanning a properly configured object upon which targets are placed to specify certain reference features. The apparatus is then reconfigured for an inspection mode, according to the reference parameters obtained in "training" mode, to analyze certain segments of the image signal of the object under inspection, the reference parameters dictating and, in effect, providing inspection instructions as to the segments which are selected, the characteristics to be analyzed, and the criteria to be used.

Figure 3:
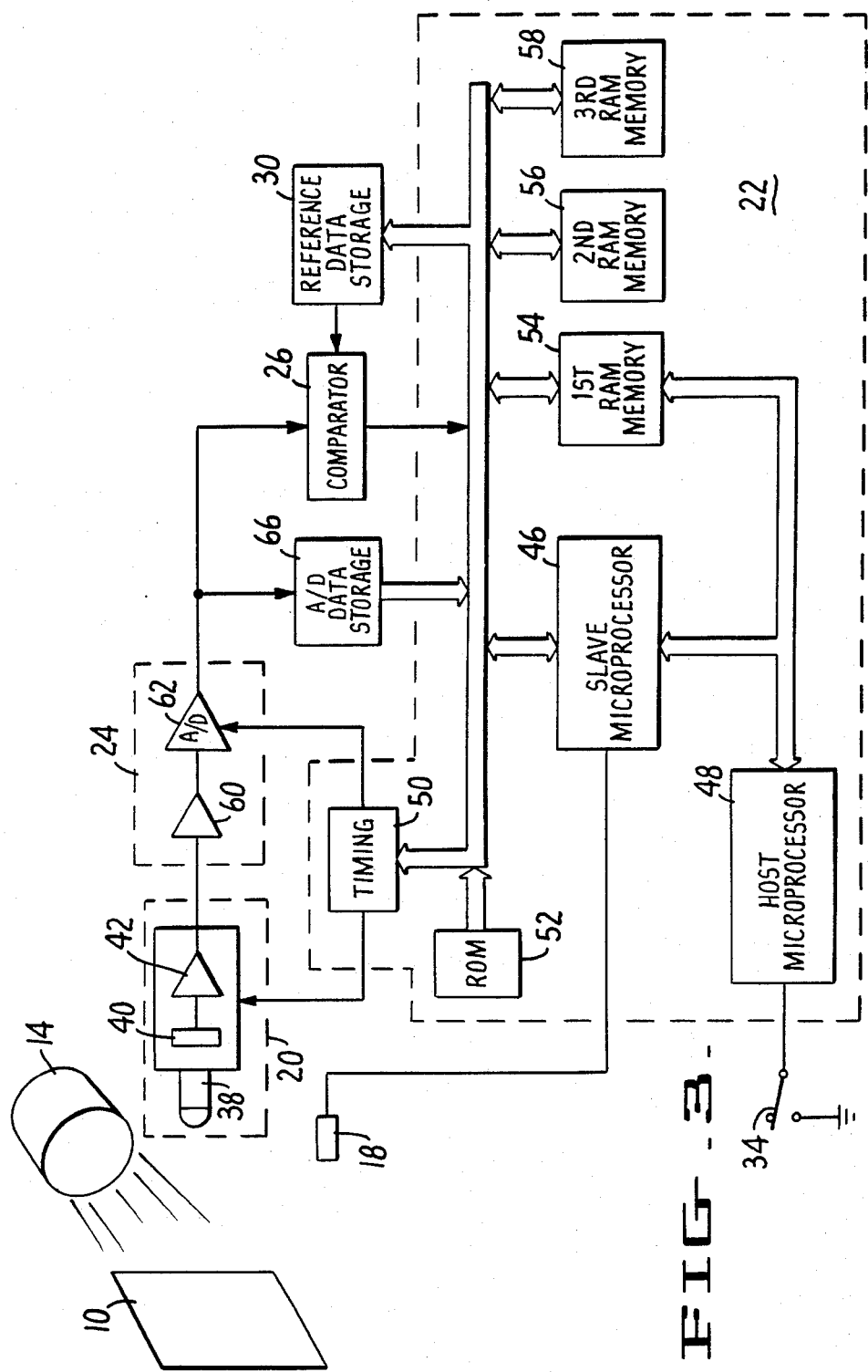
FIG. 3 is a more detailed block diagram of one embodiment of the present invention, including functional blocks.

Referring now more specifically to FIG. 3, one embodiment of the present invention will be described in greater detail. It is to be understood that the following description is not intended to limit the scope of the present invention, and that other equally satisfactory embodiments exist.

In this embodiment, the imaging and video signal-generating means 20 include an imaging lens 38, an array 40 for transforming the optical image from the imaging lens 38 into an equivalent electronic signal, and a video conditioner 42. The imaging lens 38 focuses the image on the array. The array is then scanned according to timing and control signals supplied from the intelligent processing and control means 22, on line 44.

In this embodiment of the invention, the intelligent processing and control means 22 is microprocessor based, and includes a slave microprocessor 46 and a host microprocessor 48. The slave microprocessor 46 handles the actual generation of timing and control signals which are supplied to the various signal processing blocks, while the host microprocessor 48 supplies the instructions by which the slave microprocessor 46 forms the timing and control signals. The slave microprocessor 46 also evaluates the results of the comparison function in comparative evaluation means 26 and supplies these results to the host microprocessor 48. The host microprocessor 48, in turn, makes the final decision as to whether to accept or reject the object being inspected.

In the "training" mode the slave microprocessor 46 is instructed by the host microprocessor 48 to recognize the "training" targets 32 and to recover information provided therein. The host microprocessor 48 then utilizes this information to determine the particular instruction set to be supplied to the slave microprocessor 46 by which the timing and control and data evaluation are to be performed during the object inspection mode. The interaction of the slave microprocessor 46 and host microprocessor 48 will be described in greater detail later.

The video image signal from video conditioner 42 is supplied to the signal processing and gating means 24. The signal processing and gating means 24 include a video receiver and an analog-to-digital (A/D) converter. The video receiver 60 buffers and conditions the video image signal from the video conditioner 42. The video receiver 60 can be configured to accept an automatic gain control (AGC) signal, analog offset signals, and the like from the slave microprocessor 46. Additionally, the video receiver 60 can be operated in a differential, an integral, or a single-ended input mode. Other forms of signal enhancement which can be implemented at this point include scan line to scan line correlation, element to element correlation along the orthogonal axis, subtraction of the reference from unknown signals and similar analog arithmetic operations. These can generally be implemented using adding and substracting amplifiers in combination with tapped delay lines.

The output from video receiver 60 is supplied to A/D converter 62. The A/D converter 62 can be designed to operate over a wide range of conversion speeds—for example, one conversion per second to ten thousand conversions per second. Also, the range of the converter 62 can be selected for resolutions as low as two bits (equivalent to a two level comparator) to as high as 18 bits, for example. The larger the number of bits, the larger the number of resolved signals into which the incoming analog image signal can be separated. Additionally, the A/D converter 62 can operate with a floating or a fixed full scale value; i.e., the input image signal voltage, for which the digital output of the A/D converter is the maximum available for the converter, can be either provided from some variable source or by reference voltage. If the former case, the reference voltage can be generated by analog signals corresponding to, for example, the reflectance of an optical target in the field of the view of the system, the illumination of the source, or some other varying target or signal related reference voltage. This feature is useful for example, in compensating for the change in ambient light at an inspection station during the workday. In the latter case, the digital output of the A/D converter 62 is not adjusted for variations in signal characteristics, and the reference voltage remains fixed.

The A/D converter 62 can have an additional variable property, that of suppressing or elevating the converter zero; that is, a zero digital signal can be generated for a nonzero image signal input. To do this, a reference signal is generated either using signal-related voltages, similar to the example given above for full scale adjustment, by supplying fixed voltages; by a digital-to-analog converter operating under intelligent processing and control means control; or reflectance data from a target.

Finally, the timing by which the A/D converter 62 digitizes the image signal supplied from video receiver 60, is governed by timing or enable signals supplied from the slave microprocessor 46 on line 64. This enable signal provides the gating control by which only selected portions of the video image signal are permitted to pass for further processing.

It can thus be appreciated from the above that through control of the signal processing and gating means 24 by the intelligent processing and control means 22, numerous functions can be implemented, permitting high-powered and flexible signal processing.

The signal at the output of signal processing and control means 24 can be subjected to further digital processing in digital processing means 28, dotted lines. Operations such as digital correlation, delay, subtraction or other arithmetic processes can be implemented here.

If no further digital processing is required at this point, the signal emerging from signal processing and gating means 24 is supplied directly to comparative evaluation means 26. In one embodiment of the present invention, the comparative evaluation means includes a voltage comparator which determines whether the signal supplied by the signal processing and gating means is greater than the corresponding reference data from the reference signal storage means 30.

The results of this comparison operation are then supplied to the intelligent processing means 22 for analysis.

One simplified example of the above comparison operation and of the analysis of the results of the operation by the intelligent processing and control means 22 could involve a reference feature having a horizontal, high-to-low reflectance transition along a horizontal point $Y_o$, and a tolerance specification of $\pm \frac{1}{8}$ inch. Assume for this example that each vertical scan covers 1/16 inch.

Possible reference data which would be stored in reference data storage 30 include high level data for all position coordinate pairs above $Y_o$, and low level data below $Y_o$. Assume that the image data from the object under test turned out to be high levels for all position coordinate pairs above $Y_o+1/16$ and low levels for all position coordinate pairs below $Y_o+1/16$.

The results of the comparison operation in comparator 26 would reveal that along the position corresponding to $Y_o+1/16$ the object under test had a higher reflectance than the reference data. This departure from the reference would then be analyzed by the intelligent processing and control means 22. Because the tolerance specified in the "training" mode was $\pm \frac{1}{8}$ inch, and the departure was only 1/16 inch, the decision by the intelligent processing and control means would be to accept the object under test.

An additional block is shown in FIG. 3, that of an A/D data storage means 66. This permits the digitized image signal being supplied to the comparative evaluation means 26 to be simultaneously stored in memory for evaluation at a later date. In this manner, a preliminary evaluation can be made through comparator 26, while a later, more detailed evaluation can be made using data stored within A/D data storage means 66.

The intelligent processing and control means 22 will now be described in greater detail. The intelligent processing and control means 22 includes a slave microprocessor 46, a read only memory (ROM) for nonvolatile program memory 52, a first random access memory (RAM) memory 54 for receiving slave microprocessor instructions from a host microprocessor 48, timing control means 50 which can be programmed by the slave microprocessor to control the imaging and video signal generator means 20, second RAM memory 56, and third RAM memory 58, for temporary data storage.

ROM memory 52 is provided so that the system will have a defined power-on or initialization condition. When the power is first applied, the slave microprocessor 46 accesses the ROM 52 for its instructions. During a specified test sequence, the slave microprocessor 46 reads instructions contained in first RAM memory 54. These instructions, which have been previously loaded into RAM 54 by the host microprocessor 48, dictate timing and the sequence of the operations to be performed by slave microprocessor 46. These instructions can direct the slave microprocessor 46 in the recognition and evaluation of target image signals. They can also instruct the slave microprocessor 46 in the control of the processing circuits to select portions of the image signal from an object being inspected for further processing. Typical operations include control of the imaging and video signal means 20, the reading of data stored within the A/D data storage means 66 and the supplying of those values to the host microprocessor 48, and the transfer of reference signal data to the reference data storage means 30 from second RAM memory 56 for use by the comparative evaluation means 26.

While the operations of the slave microprocessor 46 are simple in nature, these operations must be performed at high speed and in real time; in other words, at the incoming video image signal rate.

Among the advantages of allocating control functions within the intelligent processing and control means 22 among a slave microprocessor 46 and a host microprocessor 48 is that, in addition to high speed capabilities, the slave microprocessor is highly adaptable to perform various types of tests that may be desired. A typical sequence for the slave microprocessor 46 during the evaluation of an image can consist of the following steps: (1) Read the comparative data from second RAM memory means 56 and output it to the reference data storage means 30; (2) check the results of the comparison in comparative evaluation means 26; (3) store these results in third RAM memory means 58 for access by host microprocessor 48; (4) read the contents of A/D data storage means 66 and put this information in second RAM memory means 56 for future processing; and (5) inform the host microprocessor 48 when processing of the full image has been completed. At this point, the host microprocessor 48 accesses the second RAM memory 56 which holds the results of the comparison operation, and analyzes these results according to some preset criteria.

The instructions stored in the first RAM memory 54 by the host microprocessor 48 during setup and training can be very different from those required for actual testing. Allocating the processing tasks in this manner allows the imaging and processing and real-time control sections to be very general and yet require only minimal amounts of hardware. In other words, the functional blocks as shown in FIG. 1, that of reference parameter derivation means and data processing means, can be implemented by one set of hardware and a change in instructional steps. Conversely, the reference parameter derivation means and the data processing means can be each implemented by a different pair of host and slave processors, with the processor pair for the reference parameter derivation means being configured in the "training mode," and the processor pair of the data processing means being configured in the "inspection mode".

Because the effective decisions made in the signal processing sections are under the control of the host microprocessor 48, as implemented by the slave microprocessor 46, a wide variety of data processing test formats can easily be implemented. In this manner, the host microprocessor 48 is free to conduct lengthy evaluations while the slave microprocessor 46 is performing functions on a real time basis. The real time functions performed by the slave microprocessor 46 are totally under the control of the host microprocessor 48 and can be altered from time to time depending upon the requirements of the tests being conducted.

Figure 4:
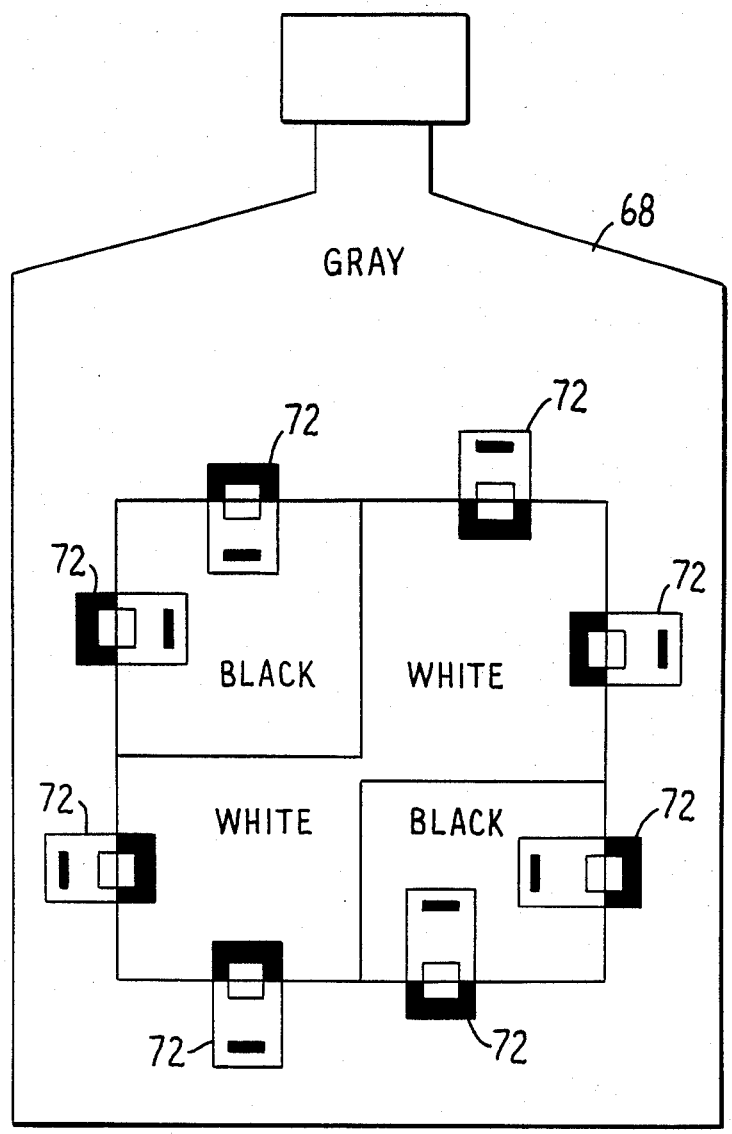
FIG. 4 is an illustration of the placement of targets on a reference object.

Referring more particularly to FIGS. 4 through 7, the optical specifying means will be described in greater detail. FIG. 4 is an example of the positioning of one embodiment of the optical pre-programming means upon a reference object. In this example, a bottle 68 having a gray color has a black and white rectangular label 70 positioned thereon. At various positions on the edge of the label 70, are affixed one embodiment of the target 32, in this case targets 72. A typical target 72 is shown in greater detail in FIG. 5. As described above, the optical specifying means designates a nominal location for a particular reference feature on the reference object, information regarding the nature of the reference feature, tolerance information by which the reference feature is to be inspected, and a number of other reference feature specifications. Essential to the operation of the optical specifying means is that it be optically distinguishable from patterns normally found in the product or objects to be inspected. In FIG. 5, the edges of the target are lined with spaced apart teeth. The tooth width and the spacing between each tooth is selected to provide an optical pattern which is highly unlike any expected pattern on the object to be inspected.

It should be noted that the teeth 74 located on perpendicular edges of the target 72 are arranged in different patterns. The pattern at the left side of target 72 has a number of equally spaced and equally wide teeth with the exception of a double-width tooth less than halfway down along the edge. The identical pattern is implemented on the right side of the target 72. However, it should be noted that the patterns at the top and the bottom of the target are different. At the top of the target, a wider tooth is positioned at the one-third and two-thirds interval along the edge, with the other teeth being of smaller width. At the bottom edge, a single double-width tooth is positioned at the center point with the other teeth being of smaller width. In this manner, the upper edge and the lower edge can be distinguished from each other.

Moving to the interior of the target 72, it will be seen that the target has a window 76. In the preferred embodiment this window is a hole in the target. Through this window 76, the actual reference feature of the reference object can be scanned. The upper portion 78 of the target has low-reflectance, while the lower portion 80 of the target has high reflectance. The transition between dark and light occurs at a point midway along the left and right edge of the window 76. A short, high-reflectance strip is positioned at a point midway along the top edge of the window 76, while a short, low-reflectance strip is positioned at a point midway along the bottom edge of the window. In this manner, these light and dark strips along with the dark-to-light transition create a kind of cross hair or graticule by which the nominal position of the reference feature is designated.

Referring to the lower portion of the target, it can be seen that a wide, low-reflectance strip is located thereon. This strip provides tolerance information to the system and can be selected by the operator.

The training target accomplishes, by optical means, the following tasks:

(1) Presents distinctive features by which the system can recognize it as a target;

(2) Provides target orientation data using the above target recognition features;

(3) Designates the center of the scanning window 76 by the asymmetrical relationship between its high/low reflectance feature pattern;

(4) Informs the optical system about the nature of the feature; in another words, whether it is a high-to-low or low-to-high transition, and in which direction the transition is oriented;

(5) Provides calibration of the scanner image in absolute terms, by the geometrical relationship between the various included patterns;

(6) Through the above calibration factor, informs the system of the locational tolerance to be applied in inspecting the positioning of the feature; and (7) Causes the intelligent processing and control means 22 to supply gating signals to the signal processing and gating means for the selective gating of the desired video image signal.

The target is recognized as such by the system in the following manner. For purposes of this explanation, assume that the imaging and video signal generator 20 or scanner, comprises a vertical scanning diode array which generates a vertical raster scan across the target. This results in the analog electrical signal shown at the bottom of FIG. 5. The higher signal level regions correspond to white or light color in the image, while the low signal level regions correspond to dark or black areas. Scan 1 is the signal generated before the target is encountered. When a target is positioned on a label, this scan will probably include regions corresponding to the structure associated with the label contents, container surface, or other features. Recall that the patterns selected for target recognition are selected to be as different as possible from any anticipated real target pattern.

Scan 2 is the pattern generated when the scanning array first encounters the pattern edge of the target. In operation, either the "training" mode or the inspection mode, the object being inspected is being moved across the field of view of the scanner by the moving platform 12. The image, therefore, sweeps across the vertical scanning array in a direction opposite that of the actual movement of the object. Consequently, each vertical scan produced by the scanning array results in an electrical signal which is slightly displaced from the previous line.

Scan 3, although displaced from Scan 2, generates the identical signal over the edge pattern. This is because the pattern is constructed to extend over a significant horizontal distance.

This electrical signal pattern will be recognized by the intelligent processing and control means 22 as a target signal. The particular pattern generated informs the intelligent processing and control means 22 of the orientation of the target. Additionally, because the pattern width and spacing are known to the intelligent processing means, the system can automatically calibrate its dimensional calculations for magnification due to the imaging means for distortions due to optical and geometric effects within the imaging and video signal generator. Once this is done, the system can then measure fixed dimensions in the object plane occupied by the target.

As the reference object and target proceed across the field of view of the scanner, signals will continue to be generated. The edge pattern also serves to indicate to the system the location of the center of the window. The black and white background coloration of the target provides additional confirmation to the system of the location of the center of the window, in addition to assisting the operator in aligning the reference feature with the center of the window.

In practice, when the target is affixed to the reference object, and over the reference feature, the target is oriented to include the darker side of the reference feature in the portion of the window corresponding to the dark background. This ensures that the system knows the direction and orientation of the high-to-low transition and where the transition occurs.

Irrespective of the target orientation, the system can independently identify the position of the window by monitoring the target edge patterns. Using the edge patterns as gating controls, the system stores the digitized form of the analog reflectance signal from the label and bottle surface within the window, and uses this information as the reference data corresponding to the particular object.

The system does not record any signals from the targets themselves (except for X/Y location of the information within the windows) or from areas of the target not enclosed by the window of the training target. The X/Y location information is referenced to the point on the object at which the system first began the scanning operation.

In this way, a system stores actual reflectance data corresponding to the critical features of the reference object, and obtains information on the nature and orientation of the feature and its nominal location.

The black and white strips 77 adjacent to the top and bottom edges of the window 76 are additional aligning aids for the operator, and need not be used.

As the system scans across the target, it encounters the black bar below the window 76, located within the white field. This can be a piece of black tape having a width corresponding to the total plus-and-minus tolerance range specified for the feature. For example, if the tolerance is desired to be plus-and-minus $\frac{1}{8}$ inch, the tape will be one-fourth inch wide. The system measures the width of this black strip and uses the width directly to set boundaries around the nominal location of the feature in the window. Because the system has already automatically calibrated itself to measure dimensions in the plane of the target, it can compute the physical tolerance in absolute units for future display.

Figure 6:
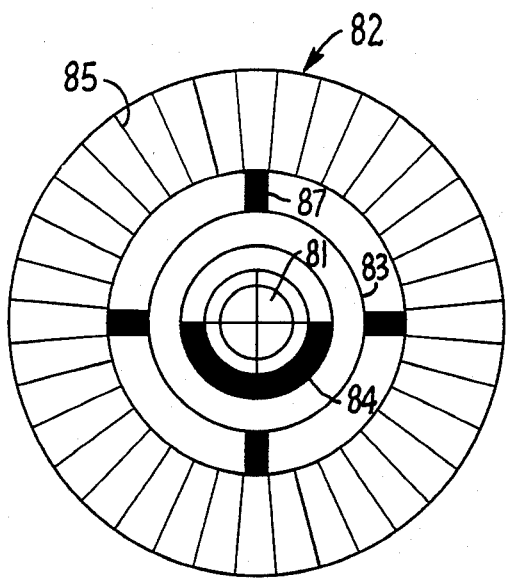
FIG. 6 is another embodiment of a target.

Referring to FIG. 6, another embodiment of the optical pre-programming means is illustrated. This embodiment is a circularly symmetric target 82. The center of the target can be a hole or made up of a transparent material. A half-black and half-white ring 84 is located concentrically with the window 81. Other larger diameter concentric rings 83 are positioned about the window. Located towards the outer edge of the target are radially extending bars 85. The radial pattern ensures that the target generates the same type of signature when encountered and scanned by the inspection system, irrespective of its orientation. When scanned by a vertically oriented line scan array, the resulting equivalent electrical signals will vary in frequency according to the graph shown in FIG. 7. Line A in FIG. 7 corresponds to the vertical scan resulting from the outermost scan of the target, while lines F correspond to the vertical scan representing the equivalent video signal resulting when scanning includes the concentric circle area of the target.

Figure 7:
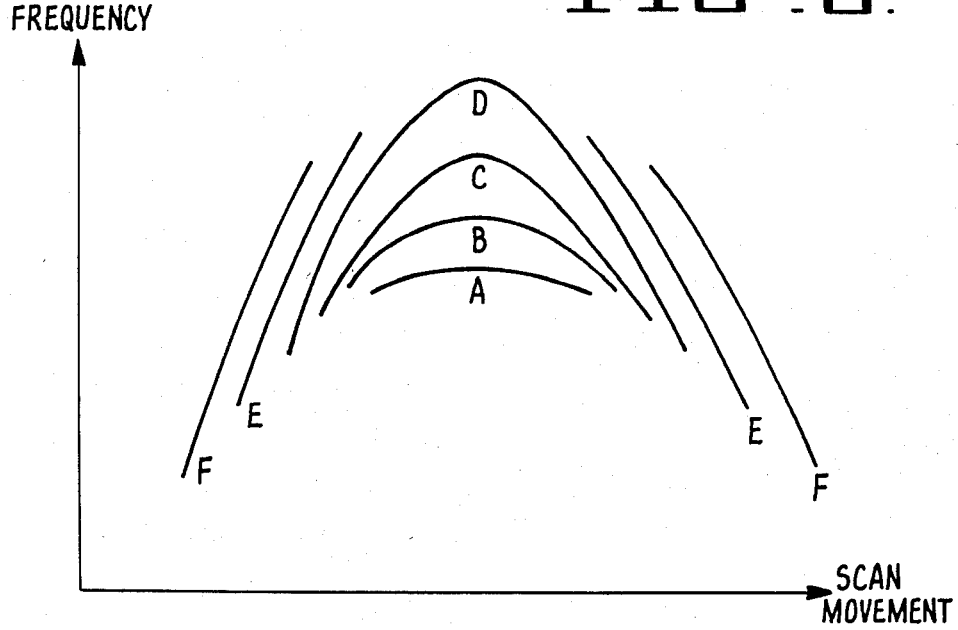
FIG. 7 is an illustration of a typical video signal obtained during the scanning of the circular target in FIG. 5.

This frequency signature of FIG. 7 is unlikely to be generated by any graphic feature, copy or label characteristics expected to be encountered, yet it will be identical for all targets in any orientation.

The radial bars 85 of the target are narrow and long, thereby minimizing the effects of the phase of the target frequency, and providing as large a number of recognition scans as possible.

The scaling of the signature can be obtained in two ways. First, with larger labels, larger targets will be used, thereby keeping the ratio of field height to target height reasonably controlled. Second, the recognition routine used to identify the particular signal will be in the frequency domain and will be implemented, in part, by control of the signal processing and gating circuit 24. The relative shape, in frequency space, rather than being restricted to a particular unique frequency can then be examined for recognition purposes.

As soon as a characteristic target signature has been recognized, the target 82 is approximately located in the field of view by means of an extrapolation of the initial time-bar geometry. This requires that the signal processing circuitry 24 be switched from the frequency transform mode required in recognition to the spatial analysis mode required for geometrical positioning.

As the system's scans move out from the radial-bar region into the concentric ring section of the target, the system will encounter, sooner or later, one of the black sections which are located at the inner edge of the radial-bar region. The system will encounter at least two of these before scanning across the clear area of the target window. These black sections 87 prenotify the system of the orientation of the cross hairs and the black/white section of the innermost concentric ring, thereby simplifying the problems of recognizing the light/dark separation and the location of the target center.

The concentric ring area is included in the target to enable additional information to be encoded in the ring width. This additional information can be tolerance data, grade level, threshold information, or other parameter data, and will be read into the apparatus.

An alternative embodiment of the circular target is to omit the concentric ring area, which can be done when additional information is not required. The radial bar area can then be extended further in toward the center of the target, thereby providing a large amount of varying horizontal structure close to the center of the target. With such a configuration, the center of the target is more easily located.

Figure 8:
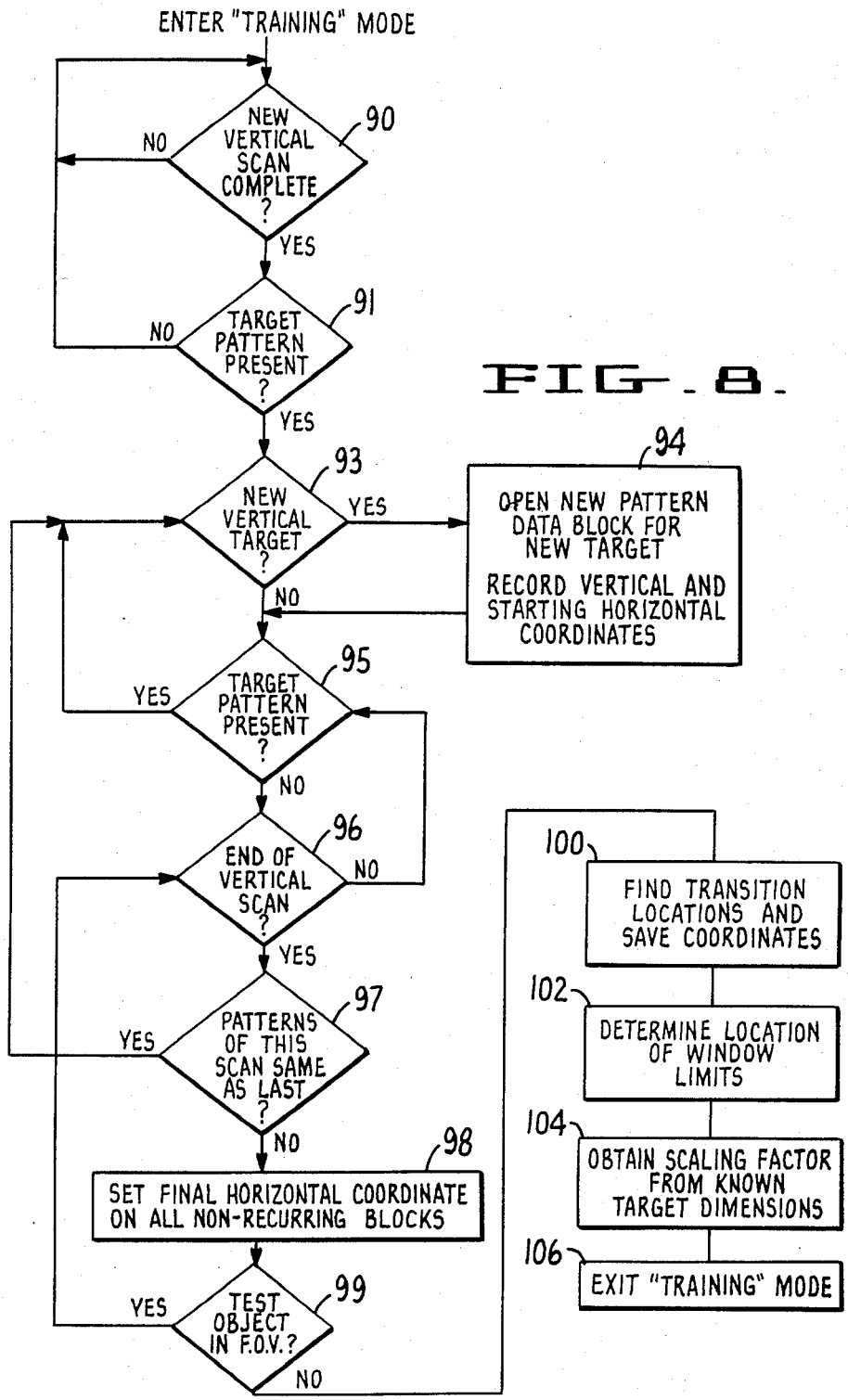
FIG. 8 is a flow diagram of the training step of the present invention.
Figure 9:
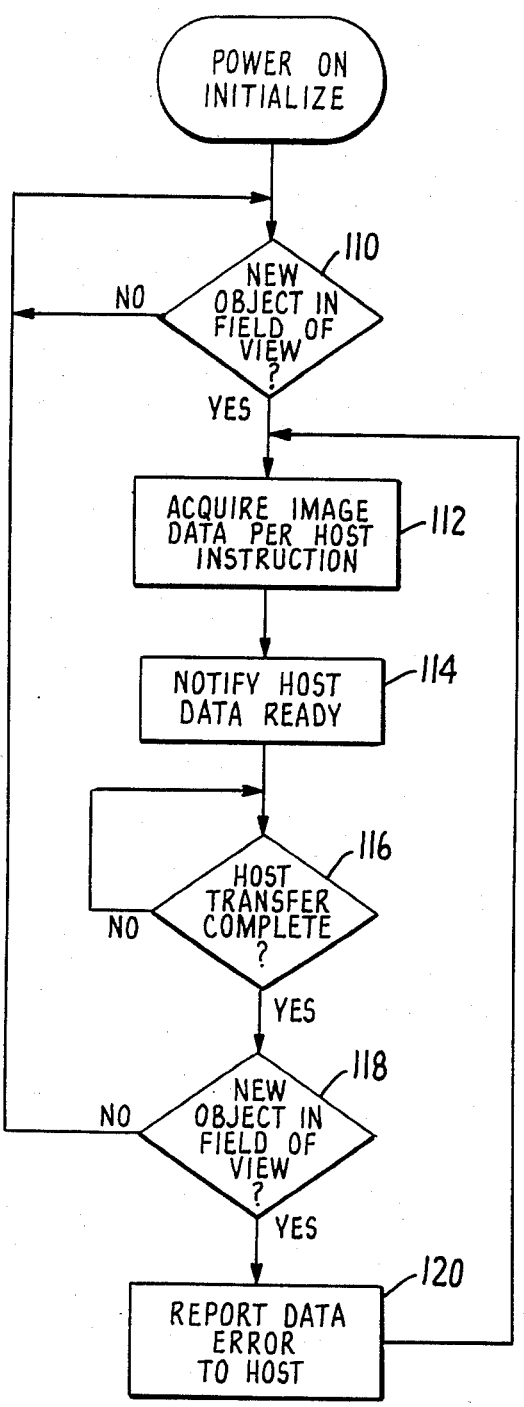
FIG. 9 is a flow diagram of a functional block of the intelligent processing and control means.

Referring now more particularly to FIGS. 8 through 10, the typical operation of the present invention will now be described.

FIG. 10 illustrates the "training" mode of the present invention. When the user activates switch 34, the system enters the "training" mode illustrated in FIG. 8, and the system begins scanning a reference object. For purposes of illustration, assume that the target configuration in FIG. 5 is being scanned.

In steps 90 and 91, the system loops through each vertical scan until a target is detected. Note that the data from the current scan are examined after the scan is complete, rather than simultaneously with the scan. This permits the system to scan rapidly until an area having a target is encountered, thus speeding the scanning process. Recall that the edge patterns of a target extend for a distance covering several vertical scan widths. The system can, therefore, rapidly scan for the presence of a target, and, upon detection of a target, switch to a slower scan speed for actual data gathering, with a substantial portion of the edge pattern still being available for scanning.

When a target is encountered, the system, in step 93, determines whether it is a new target and, if so, opens a new data block and records location information for the new target, step 94. The system will thereafter continue to monitor the current vertical scan for new targets until the scan is complete, steps 95 and 96.

When the current vertical scan is complete, the system, in step 97, examines the target scan patterns obtained for differences from the target patterns obtained in the previous scan. A difference in target pattern indicates a non recurring block of data, i.e. that the scan has entered a new portion of the target, the location of which is recorded in step 98. If no differences are detected in step 97 the system continues to process the vertical scans, recording locations of non-recurring blocks of data, until the reference object leaves the field of view (F.O.V.) of the system, step 99. Once the whole object scan has been completed, step 100 is processed in which all transition locations are found and saved.

In step 102, the location of the window limits are calculated and saved. This computation is based upon the edge patterns of the target which have been detected, and the internal reflectance data of the target, all referenced to the point at which the apparatus began scanning the reference object In step 104, the intelligent processing and control means 22 compare the dimensional data obtained in step 102 to a previously specified nominal dimension for the type of target being used. From this comparison, the apparatus can derive a scaling factor for magnification compensation. In this manner, the intelligent processing and control means 22 can examine the tolerance bar to determine the required tolerance range by which the window for viewing the objects to be inspected can be varied After the scaling factor is obtained in step 104, the intelligent processing and control means 22 proceeds to step 106 in which it exists from the "training" mode.

In the "training" mode, the apparatus, therefore, views a reference object and detects the presence of "training" targets. From these "training" targets, the apparatus obtains window location data, window tolerance data, reflectance transition information, and calculates scaling factors.

Referring more particularly to FIG. 9, the operation of the slave microprocessor 46 portion of the intelligent processing and control means 22 of one embodiment of the apparatus will now be described. Simply stated, the slave microprocessor 46 performs a predetermined and prespecified sequence of steps, with the host microprocessor specifying the substeps within certain of these steps. Whether the apparatus is in a "training" mode or in an inspection mode, the slave microprocessor 46 executes the following sequence of steps.

In step 110, the slave microprocessor 46 loops until an object enters the field of view of the imaging and video signal generator 20. When this occurs, the slave microprocessor 46, in step 112 accesses RAM memory, for example, first RAM memory 54, to retrieve instructions placed there by the host microprocessor 48. The slave microprocessor 46 then executes these instructions in processing and gating the image signal being obtained through the processing circuits 20, 24 and 26. When the image signal acquisition is complete, the slave microprocessor 46 proceeds to step 114 in which it notifies the host microprocessor that the acquired data is ready. This information can be data from the "training" mode or the object inspection mode.

In step 116, the slave microprocessor transfers data to the host microprocessor 48. In step 118, the slave microprocessor determines whether a new object is within its field of view. If not, the slave microprocessor proceeds to step 110 and waits for a new object. If a new object is within the field of view, after step 116 has been processed, this indicates that the image data obtained may be erroneous. This is because the slave microprocessor is assumed to have completed its processing of image data before the next object to be inspected enters the field of view of the imaging and video signal generator 20. In step 120, this data error is reported to the host microprocessor 48, and the slave microprocessor 48 proceeds to step 112 in which image data is again attempted to be obtained.

Referring now more particularly to FIG. 10, the operation of the host microprocessor 48 will now be described. After power on, the host microprocessor 48, in step 122, determines whether a "training" mode or an inspection mode has been requested. If a "training" mode has been requested, the host microprocessor proceeds to step 124 and halts the operation of slave microprocessor 46. In step 126, the host microprocessor transfers "training" instructions, or reference extraction signals, to the slave microprocessor, for example, by placing the instructions into first RAM memory 54. In step 128, the slave microprocessor 46 is restarted and data is acquired as described above; see FIG. 9.

During data acquisition by the slave microprocessor 46, the host processor 48 loops in step 130 until the data from the slave microprocessor 46 is ready. When the "training" data is available, the host microprocessor halts the slave microprocessor 46 operation, step 132, and reads the "training" image data from the slave microprocessor RAM, for example, second RAM memory 56 in step 134. When the image data transfer is complete, the slave microprocessor 46 is restarted, step 136. After step 136, the host microprocessor analyzes the image data as illustrated in FIG. 8, step 138. In step 140, the host microprocessor, based upon the analysis of the image data, selects a set of test instructions, or an inspection control and processing sequence, for object inspection, and inserts these test instructions into the slave microprocessor RAM, for example, the first RAM memory 54. After step 140, the host microprocessor proceeds to step 122 and determines whether the apparatus remains in the "training" mode, or whether an object inspection has been requested.

If an object inspection has been requested, the host microprocessor proceeds to step 142 in which it determines whether test data from the slave microprocessor 46 is ready. Once the test instructions have been transferred in step 140, the slave microprocessor 46 is capable of performing object inspection. Therefore, if after step 140, an object enters the field of view of the imaging and video generator 20, imaging data will be obtained by the slave microprocessor 46. In step 142, the host microprocessor 48 determines whether such data gathering has occurred and, if so, whether the process has been completed. If the slave microprocessor 46 is still acquiring data, the host microprocessor 48 loops back to step 122.

Once the data acquisition is completed by the slave microprocessor 46, the host microprocessor 48, in step 144, halts the slave microprocessor 46 operation. The host microprocessor 48 then determines whether a data error has occurred during the acquisition of the image data, step 146. If such error has occurred, the host microprocessor 48 proceeds to step 148 in which a rejection is reported to the operator. When a reject is reported in step 148, the host microprocessor 48 returns to step 122 and begins the procedure anew. If in step 146 no data error arose, the host microprocessor proceeds to read the image data stored in RAM, for example second RAM memory 56, step 148. In step 150, the host microprocessor 48 signals the slave microprocessor 46 that the data transfer has been completed. In step 152, the host microprocessor 48 restarts the operation of the slave microprocessor 46. In step 154, the host microprocessor 48 analyzes the image data just obtained and, in step 156, determines whether according to the "training" image data and analysis, the image is acceptable. If so, the host microprocessor 48 proceeds to step 122 and begins the process for the next object. If the image is unacceptable, the host microprocessor proceeds to step 148 and reports a reject.

It can, therefore, be seen that in this embodiment of the present invention a slave and a host microprocessor are utilized. The host microprocessor executes most of the decision-making steps in the process, while the slave microprocessor handles the control and data acquisition steps. The slave microprocessor looks to the host microprocessor for instructions in image data gathering, while the host microprocessor looks to the slave microprocessor for supplying image data which is to be analyzed. The host microprocessor can instruct the slave microprocessor in data gathering under a wide range of conditions. The instructions supplied by the host microprocessor to the slave microprocessor can be instructions for directing the slave microprocessor in acquiring data for a "training" mode, or for acquiring data from objects to be inspected. The slave microprocessor supplies the actual processing and control signals to the various signal-processing circuits, for example, the imaging and video generator 20, the signal processing and gating means 24, and the comparative evaluation means 26. These processing and control signals, however, are formed by the slave microprocessor according to instructions supplied by the host microprocessor.

The above identified apparatus implements a method for automatic optical inspection of specified item. The method employs a technique of obtaining a large number of image data, and eliminating redundant, unimportant, and extraneous portions of such data so that the data upon which a decision is to be made is small in quantity. This permits higher processing speed, the ability to perform signal enhancement techniques on such data in real time, and a reduction in the amount of circuitry required for such processing.

The method includes the steps of providing the system with reference image data through the use of "training" targets. These "training" targets are placed upon a reference object and designate features of the reference object to be examined, and supplying location, tolerance, and other information about the reference features. Upon completion of the "training" mode, the method includes the steps of obtaining an equivalent electrical image signal of the object under inspection, and processing and gating this image signal according to information obtained in the "training" mode. Following the gating and signal processing step, this image data is compared against reference signal data which was obtained in the "training" mode. The results of the comparison are then evaluated by an intelligent processing and control means which, in turn, renders a decision of acceptance or rejection of the particular object under inspection.

The terms and expressions which have been employed here are used as terms of description and not a limitation, and there is no intention, in the use of such terms and expressions, of excluding equivalents of features shown and described, or portions thereof, it being recognized that various modifications are possible within the scope of the invention claimed.

What is claimed is:

1. An automatic inspection apparatus for inspecting a series of illuminated objects comprising
    means positionable on a properly configured object for identifying portions on the properly configured object;
    means for recognizing the identifying means on the properly configured object including means for obtaining reference data from the identified portions and for deriving inspection instructions from the identifying means and from the reference data; and
    data processing means responsive to the inspection instructions for evaluating data in accordance with the inspection instructions to derive an accept-or-reject decision, the data originating from subsequent objects, wherein the data processing means evaluate data corresponding to portions of the subsequent objects which portions are the counterparts of the identified portions of the properly configured object.

2. The automatic inspection apparatus, as recited in claim 1, wherein the identifying means include a target which is capable of being affixed to the properly configured object, the target comprising a plurality of optically readable indicia which identify to the recognizing means the presence of one of the identified portions of the properly configured object, and a window through which the identified portions of the properly configured object can be optically scanned.

3. The automatic optical inspection apparatus, as recited in claim 2, wherein the recognizing means comprise first imaging and video signal-generating means having a selected field of view for obtaining a full video image from the properly configured object within the field of view, and for converting the video image into equivalent electrical image signals;

means responsive to the image signals for extracting the portions of the image signals which originate from targets; and processing means for analyzing the target image signals and deriving reference data and inspection instructions for each identified portion of the properly configured object.

4. The automatic optical inspection apparatus, as recited in claim 3, wherein the data processing means include second imaging a video signal-generating means, having a field of view for obtaining a full video image of a subsequent object to be inspected within the field of view, and for converting the video image into equivalent electrical image signals;

means responsive to the image signals from the second imaging means and inspection instructions for selecting the portions of the image signals which originate from those portions of the subsequent object that correspond to the identified portion of the properly configured object; and means for comparing the selected image signals to the reference data and in accordance with the inspection instructions to derive an accept-or-reject decision.

5. The automatic optical inspection apparatus, as recited in claim 4 wherein the processing means comprise a first host processor which supplies reference extraction signals to the extracting means and further wherein the extracting means extract the target image signals from the image signals in accordance with reference extraction signals, the first host processor thereafter analyzing the target image signals and, based upon the analysis, thereafter deriving reference parameters for use in subsequent object inspection, the reference parameters including a specific inspection control and processing sequence and a set of reference data.

6. The automatic optical inspection apparatus, as recited in claim 5, wherein the means for extracting target image signals comprise a first slave processor responsive to the reference extraction signals from the first host processor, the first slave processor providing control signals to the first imaging and video signal-generating means and analyzing the image signals received from the first imaging and video signal-generating means in accordance with the reference extraction signals.

7. The automatic optical inspection apparatus as recited in claim 6, wherein the inspection instructions include an inspection control and processing sequence and further wherein the comparing means comprise comparator means for comparing the selected image signals against the reference data; and wherein the first slave processor are further responsive to the inspection control and processing sequence to supply the reference data and control signals to the comparator means; and the first host processor are further coupled to the comparator means for receiving the results of the comparison and for evaluating the results in accordance with the inspection control and processing sequence to obtain the accept-or-reject decision.

8. The automatic optical inspection apparatus, as recited in claim 6, wherein the reference parameters include an inspection control and processing sequence and a set of reference data, and further wherein the means for comparing the selected image signals to the reference parameters include comparator means for comparing the selected image signals against designated reference data;

second slave processor means responsive to the inspection control and processing sequence for supplying the reference data and control signals to the comparator means; and second host processor means for receiving the results of the comparison and for evaluating the results in accordance with the reference parameters to obtain an accept-or-reject decision.

9. The automatic optical inspection apparatus, as recited in claim 8, wherein the means for selecting the image signal portions include analog processing means responsive to the equivalent electrical image signals for buffering and gain control of the image signals; and conversion means responsive to the processed image signal for converting the image signal into a digital image signal, the conversion means having variable operating speed, resolution, full scale, and zero offset capabilities of the conversion means being enabled by the second slave processor whenever the portions of the subsequent objects being scanned correspond to the specified portions of the properly configured object.

10. The automatic optical inspection apparatus as recited in claim 3, wherein the first imaging and video signal generating means further obtain a full video image from a subsequent object to be inspected within the field of view and convert the video image into equivalent electrical image signals, wherein the first imaging and video signal generating means include lens means for focusing an optical image; and optical sensor means responsive to the focused optical image for converting the optical image into an equivalent electrical image signal; and further wherein the data processing means comprise means responsive to the image signals and inspection instructions for selecting portions of the image signals which originate from those portions of the subsequent object that correspond to the identified portion of the properly configured object; and means for comparing the selected image signals to the reference data to derive an accept-or-reject decision.

11. The automatic optical inspection apparatus, as recited in claim 10, wherein the optical sensor means comprise an array of optical sensors.

12. The automatic optical inspection apparatus, as recited in claim 11, wherein the array of optical sensors has a plurality of rows and columns, and further including means for strobing the illumination of the object under inspection so that a full optical image of the object under inspection can be instantaneously obtained.

13. The automatic optical inspection apparatus, as recited in claim 11, wherein the array of optical sensors is arranged in a single vertical column so that a sequence of columnar image signals are produced as the object under inspection is scanned, the total sequence of columnar image signals providing a full image signal of the object under inspection.

14. An automatic optical inspection apparatus for inspecting an illuminated, sequentially-presented series of visually similar objects, wherein the objects are compared against a number of reference features from a reference object and a decision is made to accept or reject the current object under test, the apparatus comprising
   optical pre-programming means positionable upon the reference object for optically designating the reference features on the reference object, and for optically indicating a number of reference feature parameters and providing inspection instructions;
   imaging and video signal-generating means, having a specified field of view for obtaining a complete video image of an object within the field of view, and for converting the video image into an equivalent electrical image signal;
   signal processing and gating means responsive to the image signal for processing the image signal and for recognizing portions of the image signal as designated by the optical pre-programming means including means for deriving reference feature specifications from the recognized image signal portions and the inspection instructions from the optical pre-programming means and the recognized image signal portions;
   comparative evaluation means responsive to the reference feature specifications and the inspection instructions for comparing the selected portions of the image signal from the object under test against the reference feature specifications to provide an indication of the similarity between the selected image signal and the corresponding reference feature specifications; and
   control means responsive to the inspection instructions for examining the indication of similarity provided by the comparative evaluation means to accept or reject the object under inspection.

15. The automatic optical inspection apparatus, as recited in claim 14, further including an image signal storage means for storing image signals from the signal processing and gating means in real time so that the image signals can be recalled for analysis at a future time.

16. The automatic optical inspection apparatus, as recited in claim 14, wherein the signal processing and gating means include
   analog signal processing means for providing buffering and gain control of the electrical image signal;
   variable analog to digital conversion means for converting the electrical image signal into an equivalent digital image signal, the conversion means being responsive to an operating speed signal, a resolution signal, a full scale value signal, and a zero value signal which are supplied by the intelligent processing and control means; and
   signal selection means for selectively gating those portions of the equivalent digital image signal which correspond to the reference feature location on the reference object for further processing.

17. The automatic optical inspection apparatus, as recited in claim 14, wherein the processing and control means comprise
   slave processing and control means for controlling the imaging and video signal-generating means, the signal processing and gating means and the comparative evaluation means, and for processing the indication of similarity obtained from the comparative evaluation means; and
   host processor means for providing instructions to the slave processing and control means to direct the processing of reference feature and parameter data and the processing of data from the object under test, and for receiving the processed indication of similarity data, and for making an accept or reject decision thereon.

18. The automatic optical inspection apparatus, as recited in claim 14, further including digital processing means for enhancing the quality of a gated digital image signal, the digital processing means receiving the gated digital image signal from the signal processing and gating means, and supplying the enhanced digital image signal to the comparative evaluation means.

19. The automatic optical inspection apparatus, as recited in claim 14, wherein the imaging means include
   an imaging lens; and
   a plurality of optical to electronic sensors, wherein the imaging lens focuses the image one image on the sensors and the sensors convert the image into an equivalent electrical image signal; and further wherein sensors are controlled by a timing signal which is supplied by the intelligent processing and control means.

20. The automatic optical inspection apparatus, as recited in claim 19, wherein the optical to electronic sensors comprise an array of optical sensors.

21. The automatic optical inspection apparatus, as recited in claim 19, wherein the optical to electronic sensors comprise a vertical column of optical sensors.

22. The automatic optical inspection apparatus, as recited in claim 14, wherein the optical pre-programming means includes a target which is capable of being affixed to the reference object, the target comprising a plurality of optically readable indicia for providing the reference feature parameters, and a window through which the reference feature can be optically scanned.

23. The automatic optical inspection apparatus, as recited in claim 22, wherein the target is rectangular in shape, and further wherein the optically readable indicia comprise
   a plurality of spaced-apart teeth positioned along the outer edge of the target, the teeth having different widths and spacings which are arranged in a predetermined pattern, and
   a combination of optical reflectance transitions upon the target surface.

24. The automatic optical inspection apparatus, as recited in claim 23, wherein the pattern of teeth on parallel edges of the target are identical.

25. The automatic optical inspection apparatus, as recited in claim 23, wherein the optical transitions upon the target surface include a tolerance band for providing reference feature tolerance information.

26. The automatic optical inspection apparatus, as recited in claim 23, wherein the optical transitions upon the target surface include a low reflectance area and a high reflectance area, the areas having a transition from low reflectance to high reflectance which lies along the width of the target, the transition being coincident with a hypothetical, horizontal bisector of the window; and a plurality of fiduciary segments which are centered along a hypothetical, vertical bisector of the window, the fiduciary segments which lie in the high reflectance area having a low reflectance, and the fiduciary segments which lie in the low reflectance area having a high reflectance.

27. The automatic optical inspection apparatus, as recited in claim 23, wherein the window has a rectangular shape.

28. The automatic optical inspection apparatus, as recited in claim 22, wherein the target is circular in shape and further wherein the optically readable indicia include
a plurality of radially-extending spaced-apart bars located on the surface of the target, the bars extending from the outer edge toward the center of the target a predetermined first distance; and
a plurality of concentric, spaced-apart rings extending outward from the center of the target a predetermined second distance.

29. The automatic optical inspection apparatus, as recited in claim 28, wherein the window has a circular shape and is positioned at the center of the target.

30. An automatic optical inspection apparatus for inspecting an illuminated, sequentially-presented series of visually similar objects, wherein the objects are compared against a number of reference features from a reference object and a decision is made to accept or reject the current object under test, the apparatus comprising
optical pre-programming means positionable upon the reference object for optically designating the reference features on the reference object, and for optically indicating a number of reference feature parameters, wherein the reference feature parameters include a nominal location for each reference feature, a characterization of the optical nature of each feature, and information concerning the tolerance with which each feature is to be examined;
imaging and video signal-generating means, having a specified field of view for obtaining a complete video image of an object within the field of view, and for converting the video image into an equivalent electrical image signal;
signal processing and gating means responsive to the image signal for processing the image signal and for recognizing portions of the image signal as designated by the optical pre-programming means including means for deriving reference feature specifications from the recognized image signal portions;
comparative evaluation means responsive to the reference feature specifications for comparing the selected portions of the image signal from the object under test against the reference feature specifications to provide an indication of the similarity between the selected image signal and the corresponding reference feature specifications; and
control means for examining the indication of similarity provided by the comparative evaluation means to accept or reject the object under inspection.

31. A method of automatic optical inspection wherein a series of illuminated, visually similar objects are inspected and accepted or rejected, the method comprising the steps of
positioning optical specifying means on a properly configured object to identify portions thereof;
obtaining optical data from the properly configured object;
recognizing the presence of data from the optical specifying means in the optical data;
analyzing data from the identified portions of the properly configured object to derive reference parameters and inspection instructions for each selected portion;
comparing selected data from subsequent objects to the reference parameters in accordance with the inspection instructions, the selected data originating from those portions of each subsequent object which correspond to the specified, selected portions of the properly configured object; and
evaluating the comparison results to derive an accept-or-reject decision.

32. The method of automatic optical inspection, as recited in claim 31, wherein the step of positioning optical specifying means on a properly configured object includes the step of
placing a target over each object portion which is to be inspected, the target having optically readable indicia which identify the presence of the object portion and a window through which the object portion can be optically scanned.

33. The method of automatic optical inspection, as recited in claim 31, wherein the data analyzing step further includes the step of
designating a set of instructions based upon the analyzed data for control of data acquisition from the subsequent objects.

34. A method of automatic optical inspection, wherein a series of illuminated, sequentially presented, visually similar objects are compared against a reference object, and a decision is made to accept or reject the current object under inspection, the method comprising the steps of
positioning targets on the reference object to optically designate a number of reference features and corresponding reference feature specifications and locations on the reference object;
recognizing the presence of the targets and the designated features on the reference object;
converting the designated optical reference features and parameters into an equivalent electrical digital reference signal;
processing the digital reference signal in an intelligent processing and control means to obtain inspection instructions including location, tolerance and optically descriptive information about the reference features;
obtaining an equivalent electrical image signal from a complete video image of the object under inspection;
processing and gating the image signal so that the image signal is converted to digital form and so that the portions of the image signal which correspond to the locations of the reference features are selected for further processing;

comparing the selected digitized image signals to the corresponding digital reference signal so that an indication of similarity between the two signals is obtained; and analyzing the indication of similarity in accordance with the reference feature parameters to obtain an accept or reject determination.

35. A method of automatic optical inspection, wherein a series of illuminated, visually similar objects are inspected, and accepted or rejected, the method comprising the steps of selecting an object as a reference object against which all other objects are compared;

optically specifying particular features on the reference object for examination by placing a target over each reference feature, the target having a window through which the particular feature can be optically scanned, the target further having optically coded information;

scanning the reference object to obtain information from each target and the reference feature within each target window;

analyzing the target and reference feature information;

deriving a set of timing, control, and processing instructions and a set of reference data for use in evaluating the objects to be inspected from the target and reference feature information;

scanning the objects to be inspected according to the instruction set so that an equivalent electrical image signal of the video image of each object is obtained;

processing the electrical image signals according to the instruction set so that portions of the image signal are selected which originate from the locations on the inspected object corresponding to the locations on the reference object which were designated by each target window;

comparing the selected portions of the object image with the reference data set; and evaluating the comparison results according to the instruction set to obtain an accept-or-reject decision.

* * * * *